April 12, 1938.  E. H. WILLETTS  2,113,778
AUTOMOTIVE TRUCKING VEHICLE
Filed Jan. 11, 1936  2 Sheets-Sheet 2
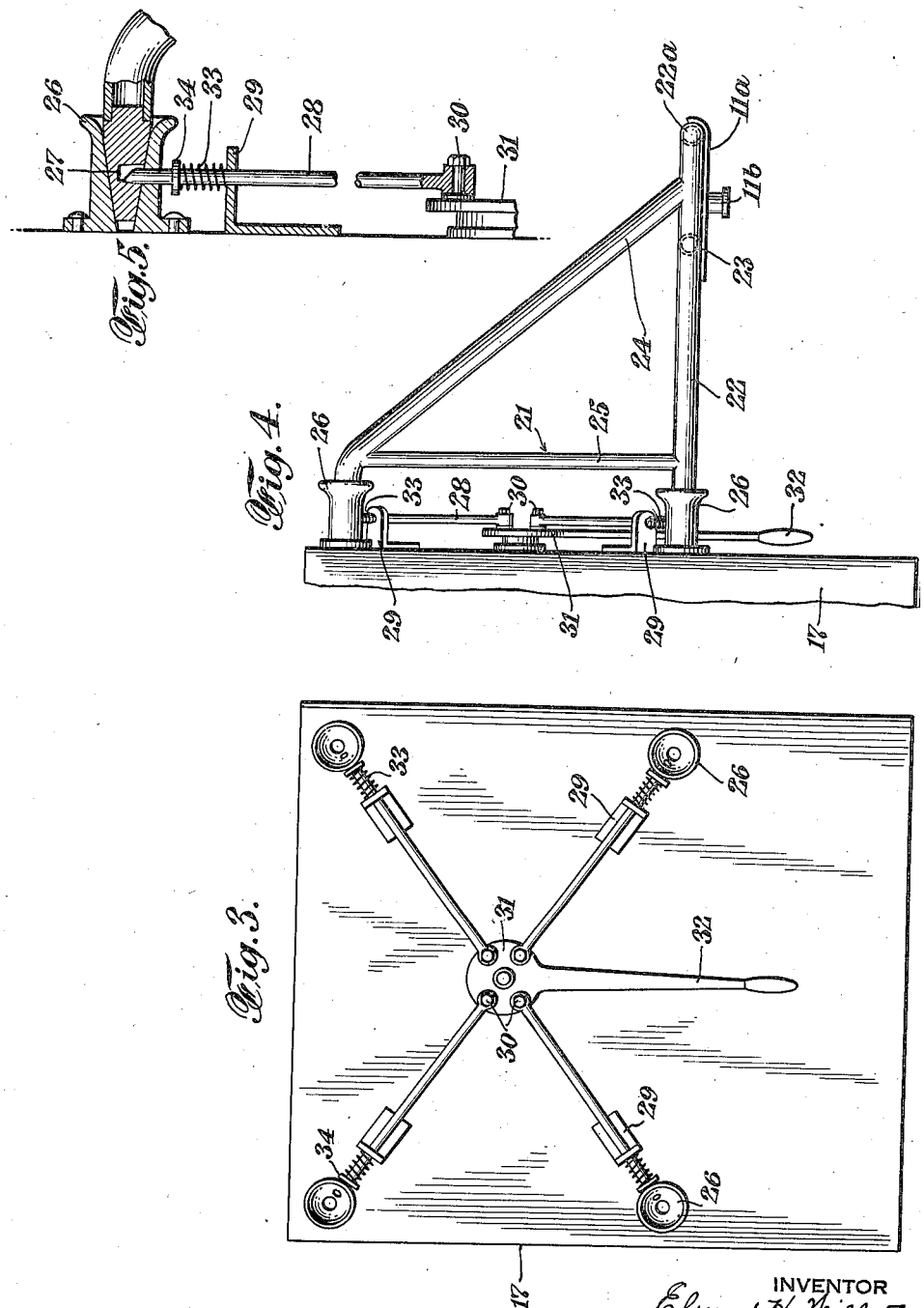
INVENTOR
Elwood H. Willetts
BY Kenyon & Kenyon
ATTORNEYS.

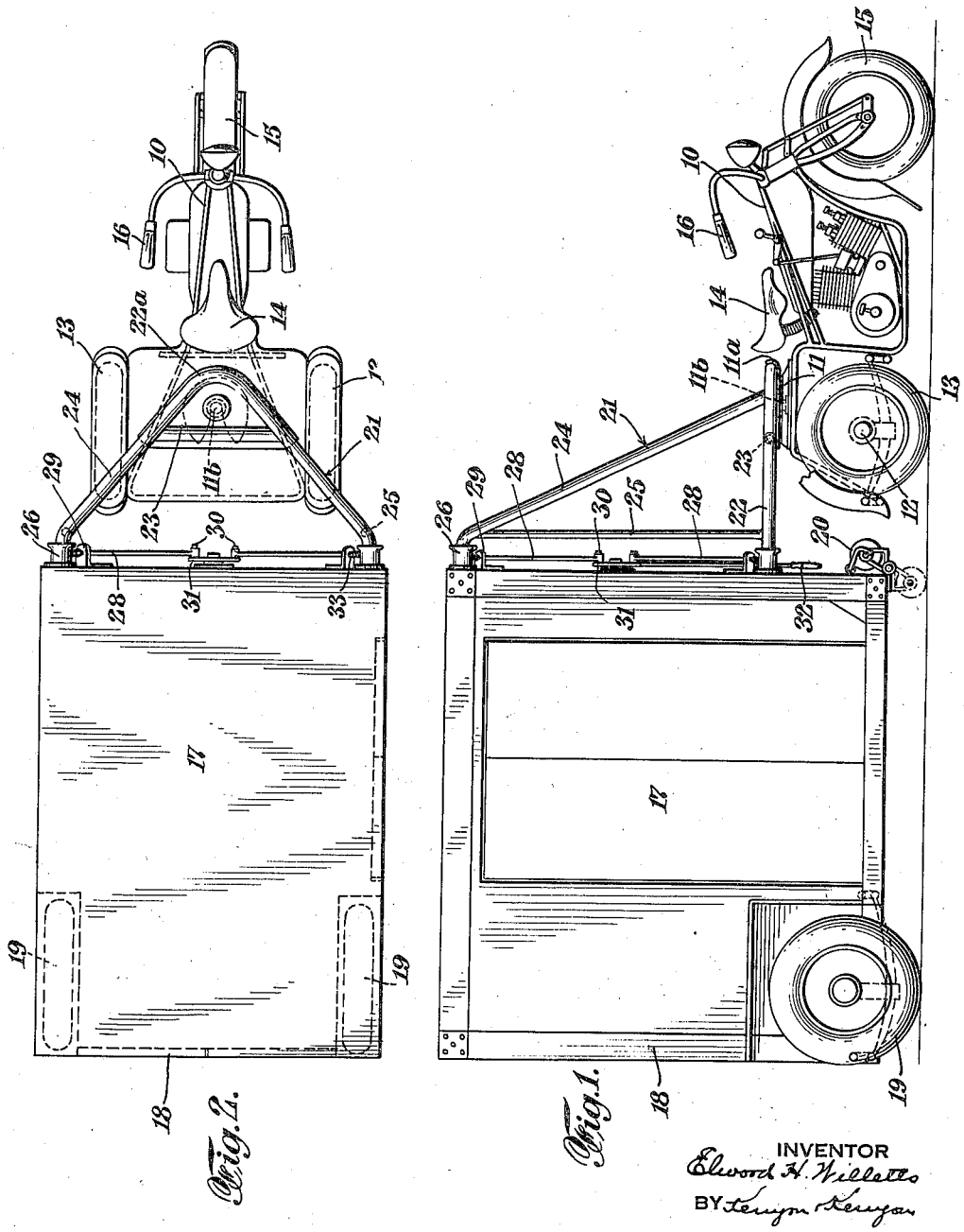

Patented Apr. 12, 1938

2,113,778

UNITED STATES PATENT OFFICE 2,113,778

AUTOMOTIVE TRUCKING VEHICLE

Elwood H. Willetts, Douglaston, N. Y.

Application January 11, 1936, Serial No. 58,628

8 Claims. (Cl. 280—33.1)

This invention relates to automotive trucking vehicles and has for an object such a vehicle of the semi-trailer type of light weight, short overall length, easy maneuverability, low initial cost and low operating cost.

A trucking vehicle embodying the invention consists of the combination of a motorcycle and a semi-trailer provided with a coupling member which is connected to a fifth wheel mounted on the frame of the motorcycle. The semi-trailer is of such size that when loaded it is within the load capability of the motorcycle and is provided at its front end with suitable supporting means for use when the trailer is disconnected from the motorcycle. Preferably, the semi-trailer is of the type shown in my Patent No. 2,038,975, of which the present application is a continuation-in-part, wherein the front wall depends close to the ground and is straight throughout its full height so that there is no inward jag at the front bottom corner of the body and a coupling member is supported by the front wall for movement into and out of horizontal position, thereby permitting storage or shipment in a space only slightly longer than the length of the body portion and with a load center of gravity sufficiently low to enable safe shipment on conventional railroad cars.

Other objects, novel features and advantages of this invention will become apparent from the following specification and accompanying drawings, wherein:

Fig. 1 is a side elevation of a vehicle embodying the invention;

Fig. 2 is a plan view;

Fig. 3 is a front view of the semi-trailer, with the coupling member detached.

Fig. 4 is a fragmentary side elevation with the coupling member in operative position, and Fig. 5 is a fragmentary section.

Referring now more especially to Figs. 1 and 2, a motor-tricycle 10 of standard construction is equipped with a fifth wheel member 11 of any conventional type supported by the frame of the motor-tricycle ahead of the rear axle 12 extending between the two rear wheels 13 and behind the operator's saddle 14. The front wheel 15 is mounted in the usual manner for steering by means of the handle bars 16.

The semi-trailer 17 consists of a body or frame portion 18 supported at its rear end by wheels 19 and is provided at its front end with supporting or landing wheels 20. A coupling member 21 is attached to and projects from the front end of the body portion 18, the coupling member being provided at its front end with a fifth wheel member 11a adapted to cooperate with the fifth wheel member 11 of the motorcycle 10 to pivotally connect the coupling member thereto, the coupling member also serving to support the front end of the semi-trailer. Either of said fifth wheel members may be provided with a king-pin 11b, while the other fifth wheel member is provided with a socket for receiving said pin.

The coupling member 21 comprises two horizontal frame members 22 which converge forwardly and are connected at their front end by a member 22a, to which the fifth wheel member 11a is attached. A cross-rod 23 extends between the frame members 22 and the fifth wheel member 11a is supported by the member 22a and cross rod 23. Two frame members 24 are connected at one end to the cross bar 23 and at the other end to vertical struts 25 rising from the horizontal frame members 22.

Socket members 26 are mounted on the front end of the body portion 18 and into them project the tapered ends of the frame members 23 and 24. The ends of the frame members 23 and 24 fit snugly into the sockets and are provided with recesses 27 into which project the locking bars 28. The locking bars 28 are slidably mounted in supporting members 29 attached to the front end of the body portion 18 and project through apertures in the sockets 26. One end of each locking rod 28 is pivotally attached by a pin 30 to a rotatable head 31 provided with an operating handle 32. Springs 33 are interposed between the supporting members 29 and collars 34 on the locking rods 28, these springs tending to project the locking rods 28 into the recesses 27.

The coupling member is detachably supported by the sockets 26 and may be readily moved to and from operative position with respect to the semi-trailer. In order to move the coupling member 21 out of operative position with respect to the semi-trailer as by demounting it therefrom, the handle 32 is swung in either direction, thereby pulling the locking rods out of the recesses 27, whereupon the coupling member may be pulled away from the body portion. When the handle 32 is released, the springs 33 return the locking rods to their original position. With the coupling member thus removed, the space required for storage or shipment of the semi-trailer is only slightly greater than the size of the body portion 18. The coupling member may be mounted on the body portion merely by inserting the ends of the frame members 23 and 24 in the sockets 26. As the ends of the frame members move into the sockets, they engage the bevel faces of the locking rods 28 causing them to move into operative position against the action of the springs 33, but as soon as the sockets 27 come into register with the locking rods 28, the latter are snapped into locking position by the springs 33. The coupling member 21 is detachably connected to the body member 18 in rigid relation thereto and it may be detachably or permanently connected to the motorcycle in pivotal relation thereto. Thus, the coupling member 21 may be attached to or disconnected from the body member either separately or while permanently or detachably connected to the motorcycle. In the latter case, the body member and the motorcycle are so moved relatively that the desired connecting or disconnecting of the body member and coupling member are effected.

The illustrated form of socket and pin connection, by means of which the coupling member may be detachably connected to the semi-trailer is a practical and satisfactory construction. It is obvious, however, that other known forms of detachable connections might be employed; and for the purposes of this invention, it is not essential whether the socket members or their mechanical equivalents be mounted upon the trailer body or upon the coupling member. For example, the socket members 26 may be mounted upon the coupling member 21, in which case the plurality of cooperating pin or stud elements would be rigidly secured to the body of the trailer. In such an alternative arrangement of these connection elements, the operating mechanism for control of the locking bolts or bars 28 would likewise be carried upon the coupling member 21, and secured thereto in the same relative relation to the socket members 26 as is illustrated in Figure 3.

The above-described trucking vehicle is of particular utility and advantage in many connections. It is of especial utility and advantage as a medium for the co-ordination of rail and highway transport, wherein these container-trailers may be loaded cross-wise of the rail cars for shipment with the forward coupling member detached, such coupling member being attached only for off rail movement by a highway tractor. It has the advantage of low initial cost and low operating cost. It also has the advantage of easy maneuverability which is highly important in congested areas and in areas where load delivering space is restricted. With the vehicle above described, light loads can be equally expeditiously and economically handled and a large saving effected in transportation costs.

I claim:

1. A semi-trailer comprising a body portion, supporting wheels therefor, a plurality of socket members carried by said body portion, a coupling and supporting member for attachment to a tractor, said coupling member having projections adapted to seat in said socket members, and means for detachably locking said projections in said socket members.

2. A semi-trailer comprising a body portion, supporting wheels therefor, a plurality of socket members carried by said body portion, a coupling and supporting member for attachment to a tractor, said coupling member having projections adapted to seat in said socket members, slidable rods for detachably locking said projections in said socket members, and a single operating member for simultaneously actuating said locking rods to release said coupling member.

3. A semi-trailer comprising a body portion, supporting wheels therefor, a plurality of socket members carried by said body portion, a coupling and supporting member for attachment to a tractor, said coupling member having projections adapted to seat in said socket members, slidable rods for detachably locking said projections in said socket members, and a rotatable member, and connections between said rotatable member and locking rods whereby rotation of said member actuates said locking rods from locking position.

4. A semi-trailer comprising a body portion, supporting wheels therefor, a coupling and supporting member adapted to be connected to and supported by a tractor for pivotal movement with respect thereto, means for detachably connecting said coupling and supporting member to said body portion in substantially rigid relation thereto, a slidable rod for locking said coupling member to said body portion, resilient means tending to hold said rod in locking position, and means for actuating said rod to release said coupling member.

5. A semi-trailer comprising a body portion, supporting wheels therefor, a plurality of socket members carried by said body portion, a coupling and supporting member for attachment to a tractor, said coupling member having projections adapted to seat in said socket members, individual means for detachably locking each projection in its socket member, and a single operating member for simultaneously actuating said locking members to release said coupling member.

6. A semi-trailer comprising a body portion, supporting wheels therefor, a plurality of socket members carried by said body portion, a coupling and supporting member for attachment to a tractor, said coupling member having projections adapted to seat in said socket members, individual means for detachably locking each projection in its socket member, a rotatable member, and connections between said rotatable member and locking means whereby rotation of said member actuates said locking means.

7. A semi-trailer comprising a body portion, supporting wheels therefor, a plurality of socket members carried by said body portion, a coupling and supporting member for attachment to a tractor, said coupling member having projections adapted to seat in said socket members, individual means for detachably locking each projection in its socket member, resilient means tending to hold said locking means in operative position, and means for actuating said locking means to release said coupling member.

8. A semi-trailer comprising a body portion, supporting wheels therefor, a plurality of connection elements carried by said body portion, a coupling and supporting member for attachment to a tractor, said coupling member having means adapted to connect with said connection elements and means for detachably locking said first named means with said connection elements.

ELWOOD H. WILLETTS.